July 16, 1940.  E. E. ALLYNE  2,208,285

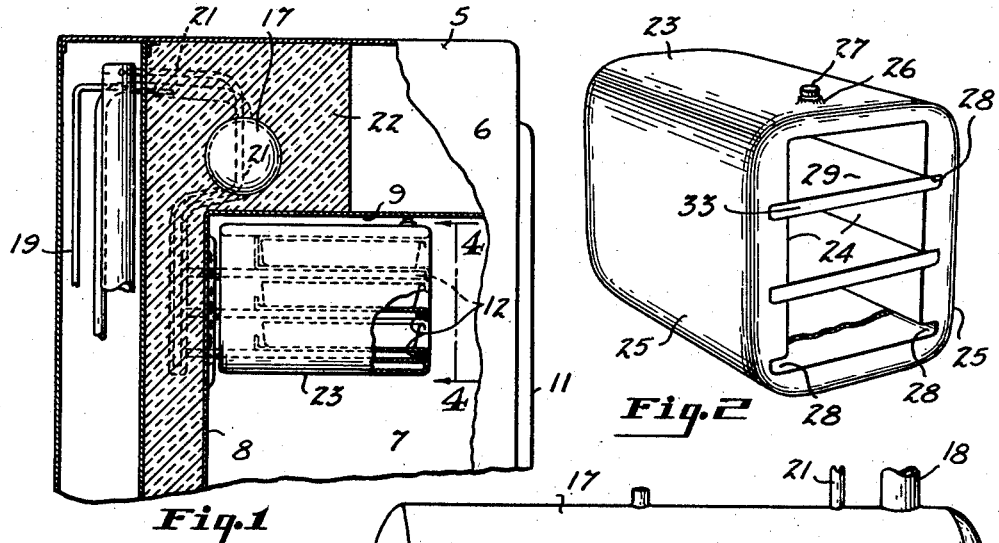

REFRIGERATION BRINE TANK AND FREEZING MEANS

Filed Jan. 3, 1938  2 Sheets-Sheet 2

INVENTOR
Edmund E. Allyne
BY George Douglas Jones
ATTORNEY

Patented July 16, 1940

2,208,285

UNITED STATES PATENT OFFICE 2,208,285

REFRIGERATION BRINE TANK AND FREEZING MEANS

Edmund E. Allyne, Cleveland, Ohio, assignor to Allyne Laboratories, Inc., Cleveland, Ohio Application January 3, 1938, Serial No. 183,041

7 Claims. (Cl. 62—95)

This invention relates to freezing means and more especially to freezing means for intermittent absorption refrigerating systems.

In intermittent absorption refrigerating systems, it is necessary to provide the freezing coils in which is carried a refrigerant medium, with some form of storage means such as the conventional brine tank, in which sufficient energy may be stored during the refrigerating cycle to maintain the food compartment temperature at an efficient point. The conventional brine tank as used in absorption refrigerating units is familiar to those skilled in the art, and will be discussed more fully following the description of the present invention.

The present invention relates to an improved brine tank structure, and means for conveying energy by conduction from the freezing coils to the brine tank and to the ice trays; and from the ice trays to the brine tank and to the freezing coils. It is believed that the present invention provides a new and efficient means of heat control by conduction.

An object therefore of the present invention is to provide a tank or container into which is introduced a liquid having a low freezing point, the said container being provided with indented channel shaped sections into which the freezing coils are inserted, the channel shaped sections being of sufficient depth to provide a portion of the section to project beyond the freezing coils, thereby providing a space between the freezing coil and the inner wall of the container.

Another object of the present invention is to provide a brine tank with indented channel shaped sections on the inner walls of the brine tank, the said sections being of such depth as to provide an unoccupied space in the section between the freezing coils and the inner wall of the tank.

Still another object of the present invention is to provide a brine tank containing a low freezing liquid, the central portion of the tank being open to receive ice trays, the inner walls of the tank having channel shaped indentations therein into which the freezing coils are inserted, the said indentations being of sufficient depth to permit a portion of the top and bottom of the channel shaped indentation to project beyond the outer diameter of the freezing coils, one portion of the indentation being provided with a metallic shelf, the said shelf being in contact with a portion of the freezing coil and wall of the brine tank.

Still another object of the present invention is to provide a brine tank for intermittent absorption refrigerators having indented longitudinal channel shaped sections therein, into which the freezing coils are inserted and a metallic tray or shelf having a portion thereof in heat conducting contact with a portion of the wall of said brine tank, and a portion of the channel shaped indented section and being secured in place between the freezing coil and a portion of the said indented surface.

A further object of the present invention is to provide an ice tray shelf for an intermittent absorption refrigerator, the said refrigerator having freezing coils and a brine tank in thermal relation thereto. The said shelf being so constructed that a portion thereof is in thermal relation with the brine tank and a portion thereof in thermal relation with the freezing coils.

A still further object of the present invention is to provide ice tray supports comprising sheet metal plates the sides of the plates being in thermal relation with the freezing coils and a portion of the brine tank of an intermittent absorption refrigerator to thereby provide thermal contact between the freezing coils and the brine tank.

Other objects of the present invention will be more fully understood from the following description when taken in connection with the drawings in which:

Fig. 1 is a side elevation sectional view of an intermittent absorption refrigerator cabinet showing the evaporator freezing coils and brine tank in position therein.

Fig. 2 is a brine tank as used in the present invention.

Fig. 3 is a front view of the evaporator and freezing coils together with the sealing plate therefor.

Fig. 4 is a front view of the brine tank showing the freezing coils, tray supports or shelves, and the ice trays and taken on lines 4—4 of Fig. 1.

Fig. 5 is a sectional view of a portion of the brine tank and freezing coils taken on lines 5—5 of Fig. 4.

Figure 6:
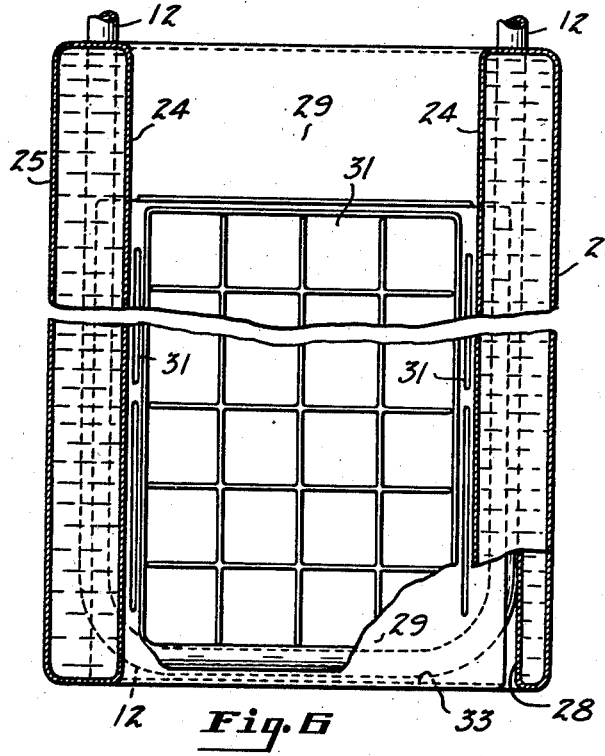
Fig. 6 is a top sectional view of the brine tank and trays taken on lines 6—6 of Fig. 4.

Referring now to the drawings by numerals and reference wherein like numerals correspond to like parts, the reference numeral 5 is the upper portion of an intermittent absorption refrigerator cabinet, a portion of the side 6 being cut away, disclosing a food chamber 7, a rear wall 8, and a ceiling 9, a door 11 of conventional design is located at the front of the box and opens into the food chamber 7.

Freezing coils 12 project into the food chamber through preferably a rectangular opening in the rear wall 8, the opening is not shown. A sealing plate 13 through which the freezing coils project and to which the coils are rigidly secured is larger than the opening in the rear wall. The sealing plate abuts this opening and is secured thereto by any suitable means such as nuts and bolts, which are placed through holes 14, these holes register with similar holes in the rear wall and the bolts pass through the said holes in the rear wall, thereby securing the plate in rigid position.

The freezing coils 12 are secured to and in open communication with two downwardly projecting supply legs. One leg 15 being of greater diameter than the other leg 16.

The depending legs are secured to and in open communication with an evaporator 17. The said evaporator receives vapor through conduit 18 which is generated in a generator absorber not shown, and is also connected with a dehydrator not shown, to which the conduit 18 is also secured and in open communication therewith.

Another conduit 19 is associated with the conduit 18 and is secured to and in open communication with a condenser and condenser receiver not shown, thus forming what is known to those skilled in the art as a 1-3-2 intermittent absorption system.

A drain conduit 21 depends into and terminates near the lower end of conduit 15 the other end of the drain conduit 21 terminating in a conduit of the system and provides a drain back conduit to remove weak liquor from the freezing coils at predetermined intervals.

It will be noted that the evaporator 17 and the supply legs 15 and 16 are imbedded in any suitable insulation such as an insulation block 22 having a portion resting on the ceiling 9 of the cabinet and also adjacent to the rear wall 8 of the cabinet.

While I prefer to illustrate and use freezing coils formed in U shape as illustrated in Fig. 3, it is not intended to limit the invention to the particular construction as illustrated, as other forms or shapes may be used with the same success.

A brine tank 23 having inner walls 24 and outer walls 25 and formed in a box like shape providing a container having a filling spout 26 and a cap 27 therefor. The brine tank is filled with a suitable low freezing liquid of conventional formula.

It will be noted that the inner walls 24 of the brine tank 23 are provided with a plurality of longitudinal channel shaped indented sections 28. It will also be noted that the depth of the said sections are greater than the outside diameter of the freezing coils, and somewhat wider.

The brine tank is so constructed and the indented sections so spaced as to slide over the freezing coils—the freezing coils being arranged and so spaced as to be in thermal contact with the rear portion of the indented sections—these sections having the bottom portion formed in a radius to conform to the curvature of the freezing coils, thus forming an efficient thermal contact therewith.

Figure 7:
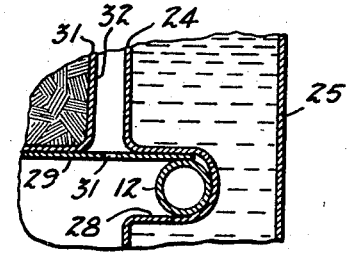
Fig. 7 is a fragmental sectional view of the brine tank, freezing coil tray support and tray as used in the present invention.

A shelf 29 preferably of a metal alloy having a high and effective thermal conductivity is provided and fits snugly between a portion of the freezing coils and a portion of the indented surface as illustrated in Fig. 7. The said shelf 29 is provided as a means of supporting ice trays and the like, and to conduct heat therefrom to the brine tank and freezing coils. A slot 31 may be provided approximately midway between the side 32 of the tray and the inner wall of the brine tank, the length of the slot may be determined by calculation or experimentation, and the purpose therefore is to retard heat transfer from the freezing coils to the ice tray during the generating cycle. This will be more fully discussed as the description of the present invention progresses.

It should be noted that when the tray is in position the brine tank is secured to freezing coils by two wedge or frictional effects. First, by the snug fit of the freezing coils with the bottom of the indented U shaped section, and second by the snug fit of the shelf between the freezing coils and a portion of the surface of the indented section.

The shelf 29 is preferably formed at the front portion thereof in an L shaped section—the leg 33 of the L being of sufficient dimension to cover the freezing coil and providing a neat and trim appearance to the front of the brine tank.

It should here be noted that the method so far disclosed provides greater thermal contact for the shelf 29 with the surface of the brine tank and will be more fully described and explained following the description of the modifications, which will now be referred to.

Figure 8:
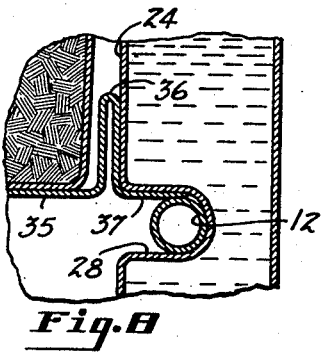
Fig. 8 is a fragmental sectional view of a modification of the brine tank freezing coil tray support and tray.
Figure 10:
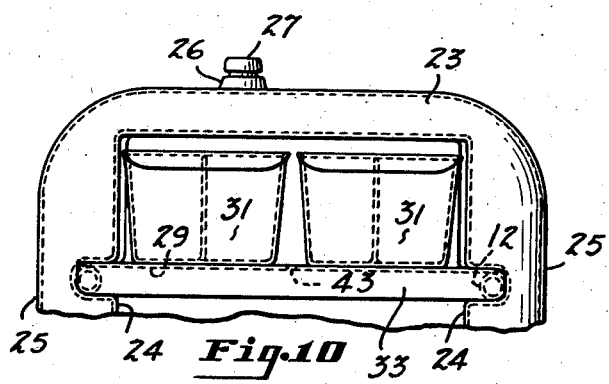
Fig. 10 is a fragmental front elevation of the brine tank, freezing coils, tray support and trays.
Figure 9:
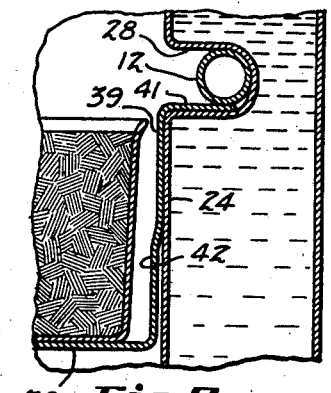
Fig. 9 is a fragmental sectional view of a further modification of the brine tank freezing coil tray support and tray.

Referring to Fig. 8, it will be noted the shelf 35 is provided with an inverted U shaped portion 36 near the edge thereof, the said inverted U shaped portion extending the entire length of the shelf, and the sides 37 of the shelf are formed in the same plane as the main portion of the said shelf 35. The sides 37 are in thermal contact with a portion of the indented section of the brine tank and secured snugly between the freezing coils and a portion of the indented surface of the brine tank. It will also be noted that one leg of the inverted U shaped portion 36 of the shelf is also in thermal contact with the side wall 24 of the brine tank. The function of this method of thermal conductivity will be fully described following the description of the second modification which now follows:

Referring to Fig. 9, a shelf 38 is provided, the sides being formed having a vertical portion 39 and an upper horizontal portion 41. The portion 41 is secured in place between the freezing coil 12 and the lower surface of the indented section 28. It is preferred to provide thermal contact between the shelf portion 39 and the wall 24 of the brine for only a portion of the shelf 39. The portion 39 of the shelf 38 is therefore bent away to avoid contact with the brine tank wall as indicated in Fig. 9 at 42. However, the entire surface of portion 39 of the shelf 38 may be provided to contact the wall 24 of the brine tank without departing from the scope and spirit of the present invention.

Figure 11:
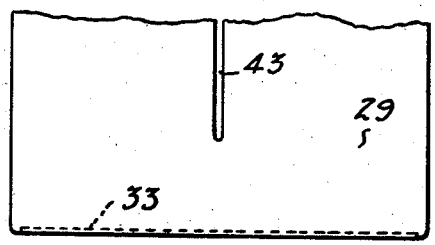
Fig. 11 is a top fragmental view of the tray support showing the front end bent down.

Ice tray shelf 29, Fig. 11, when used with a brine tank of sufficient size to accommodate two ice trays in the same compartment, may be provided with a longitudinal opening 43 therein. The length of this opening may be determined by calculation or experimentation to provide efficient freezing within each ice tray.

Having thus described the present invention it is believed advisable to now discuss the purpose thereof, and to set forth the novelty therein and the improved performance of the unit.

It is of the utmost importance for efficient performance of an intermittent absorption refrigerator to maintain the box temperature, and more especially to stabilize the box temperature during the generating cycle.

The conventional method used for maintaining box temperature is to immerse the freezing coils in the brine of the tank in which sufficient energy in the form of low temperature can be maintained, and sufficiently so to absorb the heat given off during the generating period without affecting the ice in the trays and thereby maintain refrigeration during the generating cycle or through the lapse period.

The present invention as has been shown is provided with a brine tank. The tank is in metal to metal contact with the freezing coils and with the ice tray shelves or plates. As has been noted, the sides of the shelves are also in metal to metal contact with the freezing coils, being provided with a snug fit between the freezing coils and the wall of the brine tank, and all being in efficient thermal contact therewith.

The substitution of a metal shelf in metal to metal contact with the brine tank and adjacent to the freezing coils will provide very effective results and therefore this type of structure will come under the scope of the appended claims.

When the shelves contact the freezing coils only, or are located so as to contact both the freezing coils and the portion of the brine tank adjacent thereto, extremely rapid freezing of the ice trays will result, and further, the freezing will take place in a short period of time. However, melting of the ice in the trays will also occur, and very rapidly during the generating cycle of the unit, which results in a wide fluctuation of temperature in the food compartment of the box, which naturally results in poor efficiency and unsatisfactory performance of the refrigerator.

The novelty of the invention resides in two factors—first, in providing a brine tank having longitudinal indented channel shaped sections in the inner wall of the brine tank, and in providing the depth of these sections to be of greater dimension (in depth) than the diameter of the freezing coils, and secondly to provide a metallic ice tray shelf having its sides in thermal contact with the freezing coils and one wall of the indented section of the brine tank.

The brine tank is necessary in this type or system of refrigerator to act as a cold storage or flywheel for the refrigerating portion of the system. During the generating cycle, the freezing coils naturally become warm and at times hot, due to the hot vapor which is forced into the system from the generator absorber. By providing brine tank surface contact with the shelf beyond the point of contact with the freezing coils, the heat of the coils is first absorbed by the cold brine tank, thus preventing the heat from directly affecting the ice trays. With this method it is obvious that ice tray meltage during the generating cycle is reduced to a minimum.

A modification of this method of ice tray shelf support may be provided which includes an ice tray shelf having the sides in thermal contact with the freezing coils and a portion of the indented surface of the brine tank, and to provide a slit or open section cut or stamped in longitudinal relation thereto and at a distance approximately midway between the inner wall of the brine tank and the side wall of the ice tray. The length of the opening in the ice tray support may be determined by calculation or experimenting. The opening provides a resistance to thermal flow from the freezing coils to the ice trays, and the uncut portion of the ice tray support provides the thermal contact between the freezing coils and the ice tray. With this system it is obvious that due to the thermal resistance set up by the longitudinal opening in the ice tray support heat transfer is retarded between freezing coils and ice tray. It is also obvious that heat flow from the ice trays to the freezing coils is also retarded, but this retarded flow is not sufficient to materially interfere with good refrigeration within the food chamber.

However, the modifications illustrated in Fig. 8 and Fig. 9 or similar methods present the most efficient thermal transfer yet devised.

The method of providing a longitudinal opening in the center of the ice tray support is used only when two trays are supported on the same shelf. This opening is provided to retard thermal flow from one tray to the other, its purpose being to place a damper or thermal resistor between the ice trays when a tray of fresh warm water or water having a lower temperature than the other tray is inserted in order that the latter tray cannot absorb heat from the former tray.

It will be understood that the accompanying drawings and specification disclose a preferred embodiment and the principle thereof of what I now consider to be the best mode in which I have contemplated of applying that principle. Other embodiments of the invention employing the same or equivalent principles may be used and structural changes made as desired by those skilled in the art without departing from the present invention and within the spirit of the appended claims.

What I claim is:

1. In combination with an intermittent absorption type refrigerator system, having freezing coils therein, a brine tank having opposite inner walls defining a freezing chamber, and provided with longitudinal horizontal indented portions in said inner walls of greater depth than the diameter of said freezing coils which are received therein, and tray supporting shelves, the edges of which are in thermal contact with the freezing coils and the upper faces of the said indented portions of the brine tank.

2. An intermittent absorption refrigerator system including freezing coils; a brine tank, said tank having opposite walls defining a freezing chamber and being in thermal relation with the freezing coils, the said brine tank having longitudinal indented channels in the inner walls thereof, the said channels being of greater depth than the diameter of the freezing coils; and tray supporting shelves in thermal contact with the freezing coils and the channeled walls of the brine tank.

3. In an intermittent absorption type refrigerator system, including freezing coils; a brine tank having opposite inner walls defining a freezing chamber, and provided with longitudinal horizontal channeled portions of greater depth than the diameter of said freezing coils, which are received therein; and ice tray supporting shelves having their edges in thermal contact with the freezing coils and having another portion in thermal contact with the non-channeled inner walls of said tank.

4. In an intermittent absorption refrigerator of the type having a generator absorber, evaporator and condenser connected in operative relation with supply legs depending from the evaporator, and associated with freezing coils, a brine tank in thermal relation with the said freezing coils, the said brine tank having opposed inner walls defining a freezing chamber, and indented, channel shaped portions on the said inner walls of greater depth than the diameter of the freezing coils, and ice tray shelves having their margins in thermal contact with the freezing coils and the brine tank indented portions, a portion of each shelf being also in thermal contact with the unindented portion of the inner walls of the brine tank.

5. In a refrigerator system including a generator absorber, evaporator and condenser all connected in operative relation, said evaporator having supply legs and freezing coils in open communication with the depending supply legs; a brine tank in thermal contact with the said freezing coils, the said brine tank having opposed inner walls defining a freezing chamber and indented channel shaped portions in said inner walls in which the freezing coils are located, the depth of the channel shaped portions being greater than the diameter of the freezing coils; and ice tray supporting shelves having their margins in thermal contact with the freezing coils and one side of the indented portions, and an adjacent portion of each shelf also in thermal contact with an inner wall of the brine tank.

6. In an intermittent absorption refrigerator having in combination, freezing coils; a brine tank associated therewith, the said brine tank being provided with channel shaped indentations in its inner walls in which the freezing coils are located; and ice tray supporting shelves having their margins in thermal contact with the freezing coils and the indented portions of the brine tank, an adjacent portion of shelf also being in thermal contact with an inner wall of the brine tank.

7. In an intermittent absorption refrigerator vertically spaced freezing coils; a compartment defining brine tank associated therewith, the said brine tank being provided on its inner wall with longitudinal channel shaped portions of appreciably greater depth and width than said freezing coils which are positioned therein; and ice tray supporting means having a portion thereof in thermal contact with the freezing coils and the brine tank.

EDMUND E. ALLYNE.